United States Patent
Chen et al.

(10) Patent No.: US 7,610,393 B1
(45) Date of Patent: Oct. 27, 2009

(54) MOBILE IP SUPPORTING QUALITY OF SERVICE

(75) Inventors: Xiaobao Chen, Eastleaze (GB); Ioannis Kriaras, Bradenstoke (GB); Andrea Paparella, Swindon (GB)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days.

(21) Appl. No.: 09/512,411

(22) Filed: Feb. 24, 2000

(30) Foreign Application Priority Data

Feb. 26, 1999 (EP) ................... 99301481

(51) Int. Cl.
*G06F 15/16* (2006.01)

(52) U.S. Cl. .............. 709/230; 709/200; 713/161; 713/168; 713/171; 395/200; 395/680; 455/450; 455/446; 455/452

(58) Field of Classification Search ........... 709/230, 709/245, 240, 232, 241, 203, 200; 713/167, 713/161, 168, 171; 370/328, 338, 392, 332; 455/435, 435.1, 434, 450, 446, 452; 395/200, 395/680

See application file for complete search history.

(56) References Cited

U.S. PATENT DOCUMENTS

| | | | |
|---|---|---|---|
| 5,745,480 A | 4/1998 | Behtash et al. | 370/252 |
| 5,751,813 A | 5/1998 | Dorenbos | 380/49 |
| 5,764,645 A | 6/1998 | Bernet et al. | 370/466 |
| 5,790,789 A * | 8/1998 | Suarez | 709/202 |
| 5,862,345 A | 1/1999 | Okanoue et al. | 395/200.68 |
| 5,870,548 A * | 2/1999 | Nielsen | 709/206 |
| 5,878,348 A * | 3/1999 | Foti | 455/434 |
| 5,903,735 A * | 5/1999 | Kidder et al. | 709/240 |
| 5,913,032 A * | 6/1999 | Schwartz et al. | 709/213 |
| 5,978,678 A * | 11/1999 | Houde et al. | 455/433 |
| 6,023,345 A * | 2/2000 | Bloomfield | 358/402 |
| 6,035,327 A * | 3/2000 | Buckley et al. | 709/206 |
| 6,047,327 A * | 4/2000 | Tso et al. | 709/232 |
| 6,076,101 A * | 6/2000 | Kamakura et al. | 709/206 |
| 6,105,027 A * | 8/2000 | Schneider et al. | 707/9 |

(Continued)

FOREIGN PATENT DOCUMENTS

EP 0 790 751 A2 8/1997

(Continued)

OTHER PUBLICATIONS

Rajagopalan, B. "Mobility And Quality of Service (QoS) In The Internet" Mobile Multimedia Communications Proceedings of $3^{rd}$ International Workshop On Mobile Multimedia Communications, Princeton, NJ, USA, Sep. 25-27, 1996, pp. 129-135, p. 130, paragraph 3, p. 131, paragraph 2, p. 133, paragraph 4 and 5.

(Continued)

*Primary Examiner*—Thanh Tammy Nguyen

(57) ABSTRACT

A quality of service session is established between a correspondent node and a mobile node. The mobile node has a home address in a home network is temporarily connected at a care-of address in a foreign network. A modified reply message is generated in the foreign network. The modified reply message has a source address of the mobile node's care-of address and a destination address of the correspondent node. The modified reply message is then transmitted. A capable of supporting such a quality of service session is also disclosed.

14 Claims, 9 Drawing Sheets

U.S. PATENT DOCUMENTS

| | | | |
|---|---|---|---|
| 6,130,892 A | 10/2000 | Short et al. | 370/401 |
| 6,178,505 B1* | 1/2001 | Schneider et al. | 713/168 |
| 6,185,288 B1* | 2/2001 | Wong | 379/219 |
| 6,195,705 B1 | 2/2001 | Leung | 709/245 |
| 6,215,779 B1* | 4/2001 | Bender et al. | 370/338 |
| 6,219,694 B1* | 4/2001 | Lazaridis et al. | 709/206 |
| 6,230,012 B1* | 5/2001 | Willkie et al. | 455/435.1 |
| 6,282,565 B1* | 8/2001 | Shaw et al. | 709/206 |
| 6,304,913 B1* | 10/2001 | Rune | 709/241 |
| 6,405,225 B1* | 6/2002 | Apfel et al. | 707/526 |
| 6,434,134 B1* | 8/2002 | La Porta et al. | 370/338 |
| 6,449,365 B1* | 9/2002 | Hodges et al. | 379/1.01 |
| 6,477,644 B1* | 11/2002 | Turunen | 713/161 |
| 6,496,505 B2* | 12/2002 | La Porta et al. | 370/392 |
| 6,567,664 B1* | 5/2003 | Bergenwall et al. | 455/403 |
| 6,591,306 B1* | 7/2003 | Redlich | 709/245 |
| 6,625,135 B1* | 9/2003 | Johnson et al. | 370/332 |
| 6,654,359 B1* | 11/2003 | La Porta et al. | 370/328 |
| 6,665,537 B1* | 12/2003 | Lioy | 455/435.1 |
| 6,842,456 B1 | 1/2005 | Chen et al. | 370/401 |
| 6,850,764 B1* | 2/2005 | Patel | 455/450 |
| 7,006,472 B1* | 2/2006 | Immonen et al. | 370/332 |

FOREIGN PATENT DOCUMENTS

| | | |
|---|---|---|
| WO | WO 98/40990 | 9/1998 |
| WO | WO 99/21327 | 4/1999 |

OTHER PUBLICATIONS

Jain, R., et al "Mobile Internet access and QoS Guarantees Using Mobile IP and RSVP With Location Registers", ICC '98. 1998 IEEE International Conference On Communications. Conference Record. Affiliated with Supercomm '98, ICC '98, IEEE International Conference on Communications. Conference Record Atlanta, GA USA, Jun. 7-11, 1998, pp. 1690-1695 vol. 3, p. 1690, left-hand column, paragraph 2, p. 1691, left-hand column, paragraph 3.

Tanenbaum, A.S. "Computer Networks, Third Edition" 1996, p. 367, paragraph 2, p. 370, paragraph 1.

Andreoli, C. et al "Mobility Management in IP Networks Providing Real-Time Services", Gateway To The Twenty First Century, International Conference On Universal Personal Communications, 1996 $5^{th}$ IEEE International Conference On Universal Personal Communications Record, Proceedings of ICUPC —$5^{th}$ International Conference, pp. 774-777 vol. 2, p. 774, right-hand column, paragraph 2, p. 776, left-hand column, paragraph 5.

European Search Report, dated Sep. 27, 1999.

Charles E. Perkins, Mobile IP , IEEE Communications Magazine, May 1997, pp. 84-86, 91-99.

C. Perkins, IP Mobility Support, Oct. 1996, pp. 1-79.

R. Singh, et al, "RAT: A Quick (And Dirty?) Push for Mobility Support*", *in Proceedings of WMCA '99 for Second IEEE Workshop on Mobile Computing Systems and Applications*, Feb. 25-26, 1999, pp. 32-40 (IEEE Comput. Soc).

R. Braden, et al, Abstract and Introduction (p. 4) of "Resource ReSerVation Protocol (RSVP), Version 1 Functional Specification". RFC 2205, (Network Working Group) Sep. 1997, pp. 2.

C. Perkins, "Minimal Encapsulation within IP", RFC 2004, (Network Working Group) Oct. 1996, pp. 1-6.

C. Perkins, "IP Mobility Suport", RFC 2002, (Network Working Group) Oct. 1996, 78 pages.

* cited by examiner

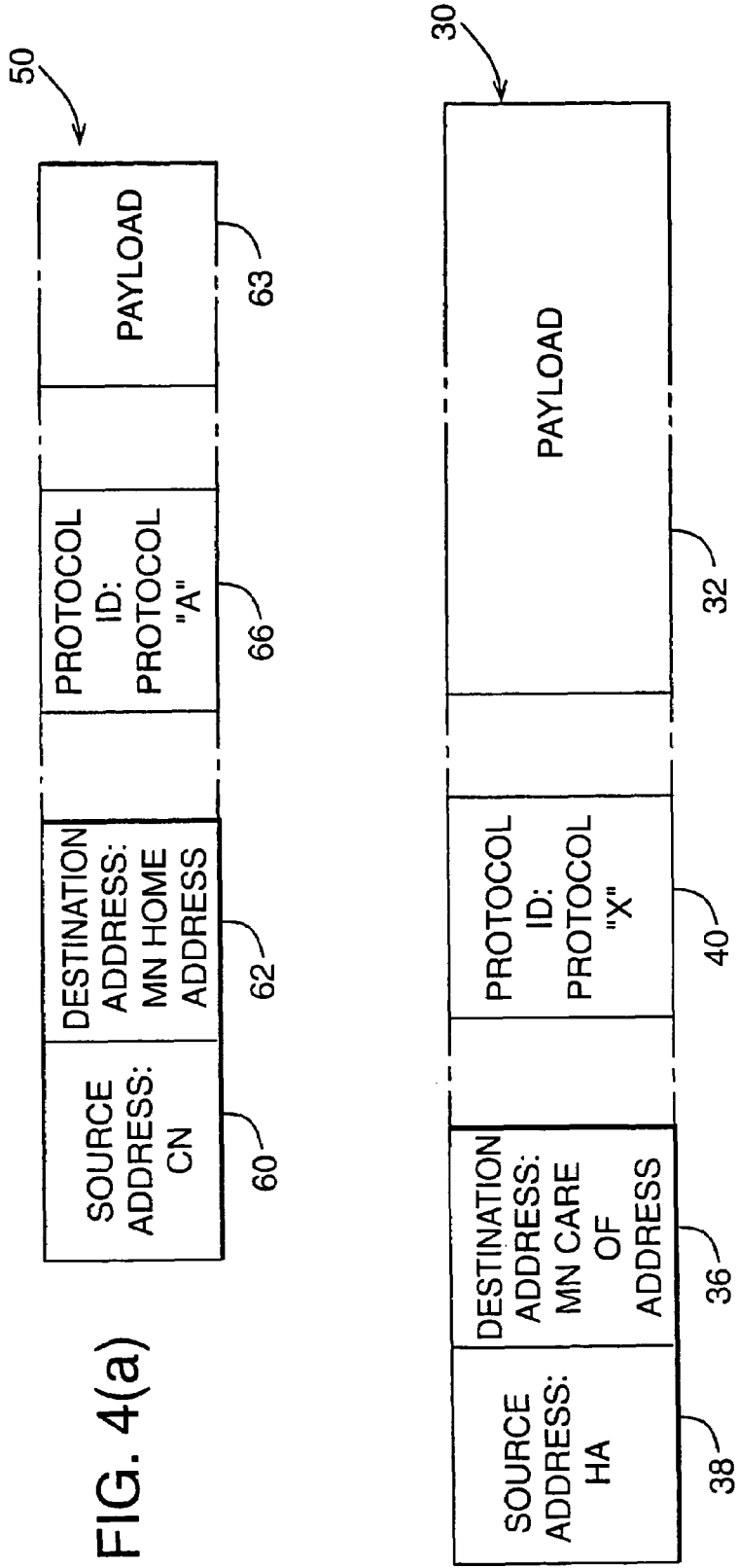

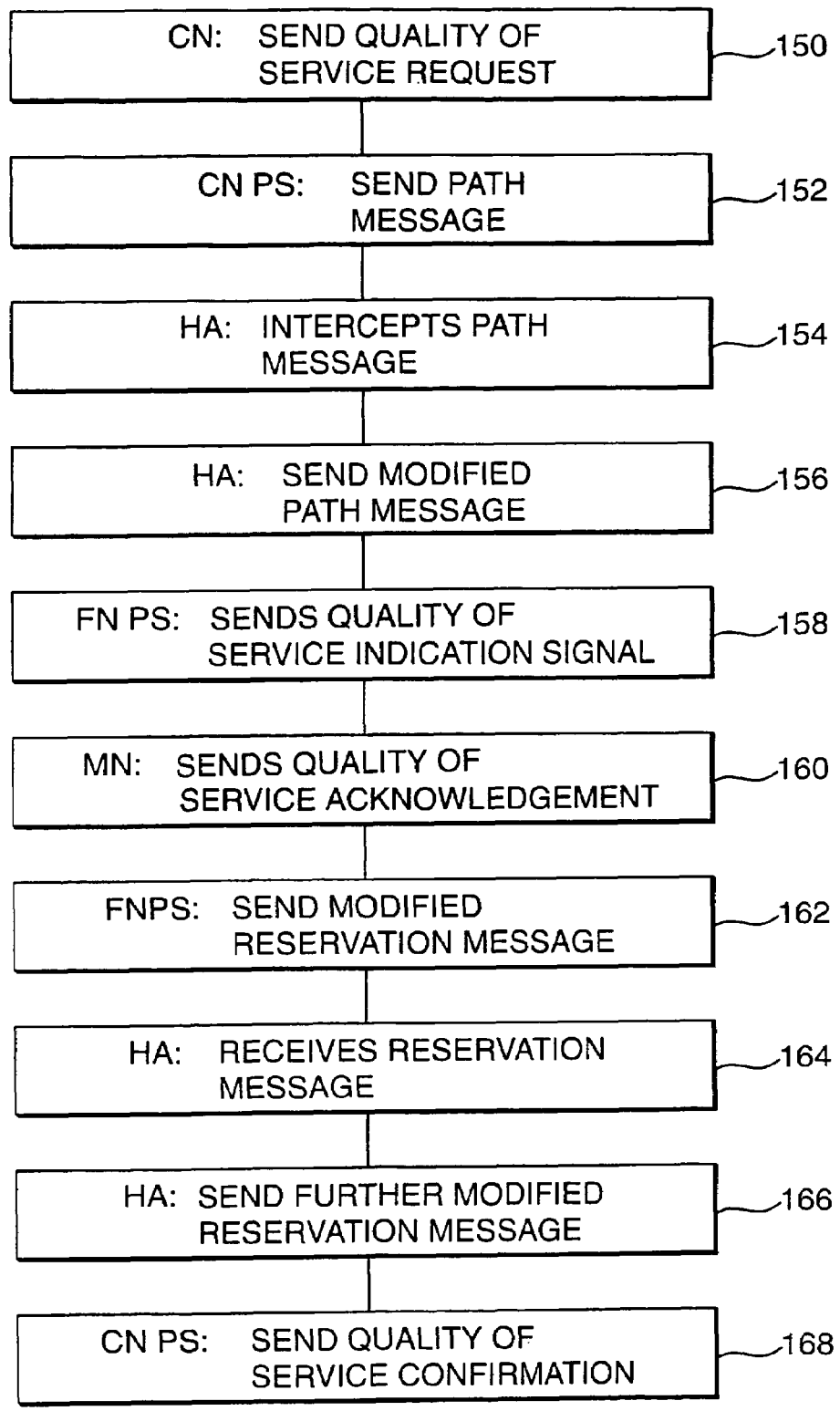

MOBILE IP SUPPORTING QUALITY OF SERVICE

CROSS-REFERENCE TO RELATED APPLICATION

This application claims priority of European Patent Application No. 99301481.0, which was filed on Feb. 26, 1999.

FIELD OF THE INVENTION

The present invention relates to messages conforming to the mobile Internet Protocol (mobile IP) and sent from a node in a network to a mobile node, and particularly to maintaining a desired quality of service.

BACKGROUND TO THE INVENTION

Current Internet Protocol (IP) technology and mobile IP technology enables a host terminal or host node which is normally connected in a particular network (the node's 'home' network) to temporarily connect into a different network (a 'foreign' network) and still receive IP packets or messages sent to the host terminal at its address in the home network. Such a host terminal, which changes its point of network attachment, is known as a mobile node.

To still receive IP packets in the foreign network the mobile node must register with a so-called 'home agent' in its home network. In registering with its home agent, the mobile node provides the home agent with a 'care-of' address where it can be addressed in the foreign network. The home agent then monitors traffic in the home network, and if the home agent identifies an IP packet that is carrying a destination address corresponding to the mobile node's home address in the home network, it intercepts the IP packet. The home agent then 're-packages' the IP packet and sends it to the node at the 'care-of' address in the foreign network.

The 'care-of' address may be a co-located care-of address or a foreign agent care-of address.

The technique of directing an IP packet, destined for an address in the home network, to a 'care-of' address in the foreign network is known, in mobile IP, as 'tunneling'. It is important in tunneling the IP packet to the 'care-of' address that certain information concerning the original IP packet is retained in the re-packaged IP packet. For example, as well as maintaining the original payload (or information portion) of the IP packet, the mobile node at the 'care-of' address must still be able to identify in the 're-packaged' IP packet the source address from which the IP packet was originally sent and the home address of the mobile node in the home network.

One technique known in mobile IP for 'tunneling' an IP packet to a mobile node 'care-of' address encapsulates the original IP packet into a new IP packet as the IP packet payload. That is the original IP packet is incorporated as the payload (or information portion) of the new IP packet without any change to its content. The 'care-of' address is added to the new IP packet as the new destination address and the source address of the new IP packet is identified as the home agent. On receipt the mobile node at the 'care-of' address removes the 'wrapping' on the new IP packet to recover the original IP packet.

One disadvantage with this technique is that the repackaged IP packet does not facilitate the support of quality of service provisions in conformance with existing IP quality of service standards.

Each IP packet has associated therewith, and included in the IP packet, flow identification information that identifies the quality of service associated with the IP packet transmission. This flow identification information is present in fixed locations of the IP packet, where quality of service (QoS) capable routing/switching elements can locate it and operate in dependence on it. However, with the encapsulation tunneling technique the flow identification information included in the IP packet by the source originating the IP packet is not available between the home agent and the 'care-of' address.

Thus the encapsulation technique in conventional mobile IP (one of which is known as IP-in-IP encapsulation) shields the real source address (i.e. the address of the correspondent node) and real destination address (i.e. the mobile node's home address), as well as the protocol ID in the IP packets, from the home agent to the mobile node. In addition, encapsulation mobile IP also changes the payload infrastructure (the original IP header becomes part of the payload) and fails flow differentiation if routers are not changed accordingly so as to be able to detect the modifications or changes. Changes or even slight modifications of routers often require a large amount of re-design and re-placement of all existing routers. This far more complicates the control and management of the networks. It may also cause problems in terms of security control and inter-operability.

The quality of service (QoS) provisions proposed to be used in the Internet are defined by standards, and in IP one known standard for quality of service signaling is called Resource Reservation Protocol (RSVP). RSVP is used in the Integrated Services Model (IntServe) quality of service framework defined by IETF. The Integrated Services Model was designed to provide special handling for certain types of traffic, provide mechanisms for applications to choose between multiple levels of delivery services for its traffic, and to provide signaling for quality of service parameters at Layer 3 in the OSI RM (signaling at layer 2 in ATM).

IntServe defines two classes of services. The Controlled Load Class provides traffic delivery in the same way as when the network is unloaded ("better than best delivery"). The Guaranteed QoS Service Class delivers traffic for applications with a bandwidth guarantee and delay bound.

IntServe requires QoS capable nodes and a signaling protocol to communicate QoS requirements between applications and nodes and between nodes.

RSVP is the QoS signaling protocol used by IntServe. RSVP provides receiver QoS requests to all router nodes along the transit Path of the traffic, maintains the soft-state (Path/Reservation states), and results in resources being reserved in each router.

For RSVP/IntServe quality of service to operate, the flow identification information must be in a fixed location in the IP packets. An RSVP session is configured by the host terminals exchanging so-called Path and Reservation messages prior to data transmission.

To enable the quality of service control across the transit path between peer host terminals, each host terminal must therefore have the functionality to configure the necessary messages and recognize quality of service requests corresponding to an RSVP session.

Existing RSVP does not specify how to specifically process Path and Reservation (Resv) messages in the scenario of mobility control based on mobile IP. Moreover, the 'tunneling' of standard mobile IP (e.g. IP-in-IP encapsulation) disables the correct flow identification and classes of service differentiation.

It is therefore an object of the present invention to provide a technique which enables the quality of service requirement determined by the source of the message to be supported throughout the routing of the message to a mobile node's 'care-of' address.

SUMMARY OF THE INVENTION

According to the present invention there is disclosed a method of establishing a quality of service session between a correspondent node and a mobile node, the mobile node having a home address in a home network and being temporarily connected at a care-of address in a foreign network. A modified reply message is generated in the foreign network. The modified reply message has a source address of the mobile node's care-of address and a destination address of the correspondent node. The modified reply message is then transmitted. The present invention is generally applicable to any quality of service session that utilizes request and reply messages between two terminals for configuring a quality of service session.

The method may further include receiving, in the home network, a request message having a source address of the correspondent node and a destination address of the mobile node's home address. A modified request message is then creating by replacing the destination address of the request message with the mobile node's care-of address. The modified request message is transmitted to the foreign network, whereby the reply message is generated responsive to the modified request message.

The method may further include receiving, in the home network, the modified reply message and creating a further modified reply message by replacing the source address with the mobile node's home address. The further modified reply message is then transmitted.

The step of generating the modified reply message may be carried out in the mobile node or by a proxy device in the foreign network associated with the mobile node. The step of generating the modified reply message may include generating a reply message having a source address of the mobile node's home address and a destination address of the correspondent node and replacing the source address with the mobile node's care-of address, thereby generating the modified reply message.

The method may further include sending a quality of service indication signal to the mobile node, responsive to receipt of the modified request message at the proxy device. The modified reply message is generated responsive to receipt of a quality of service acknowledgment from the mobile node.

The correspondent node may generate the request message and receive the further modified reply message. Alternatively, the correspondent node may be associated with a correspondent proxy device, whereby the correspondent proxy device generates the request message responsive to a quality of service request from the correspondent node. The correspondent proxy device also generates a quality of service confirmation responsive to receipt of the further modified reply message.

The invention also provides a mobile IP environment capable of supporting a quality of service session, including a correspondent node and a mobile node, the mobile node having a home address in a home network and being temporarily connected at a care-of address in a foreign network. The foreign network having a proxy device associated with the mobile node for generating a modified reply message having a source address of the mobile node's care-of address and a destination address of the correspondent node. The proxy device may be provided in the mobile node or separate to the mobile node.

BRIEF DESCRIPTION OF THE FIGURES

FIG. 4(a) illustrates an IP packet constructed by the correspondent network for transmission to a mobile node in the home network, and FIG. 4(b) illustrates the modification of that IP packet to re-direct it to the foreign network according to the prior art;

FIG. 8 illustrates the steps of performing a preferred implementation of an RSVP operation in mobile IP.

DESCRIPTION OF PREFERRED EMBODIMENT

Figure 1:
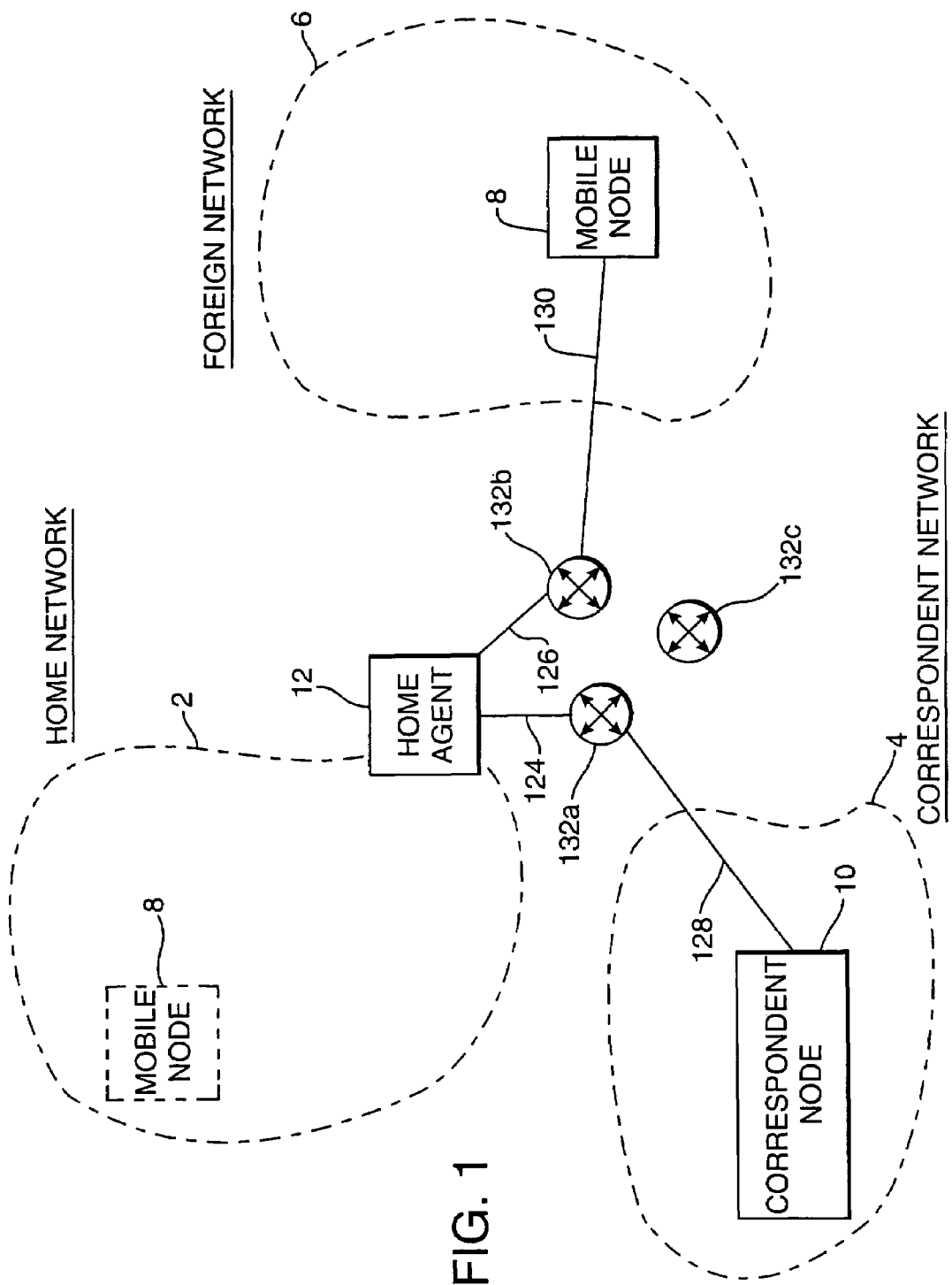
FIG. 1 illustrates a network set-up including a home network, a correspondent network, and a foreign network.

Referring to FIG. 1 there is shown a typical network set-up. A mobile node MN 8 to which a message is to be sent is normally located in a home network 2. The mobile node MN 8 normally resides in the home network 2 at a particular address. This address is not necessarily a static IP address: the mobile node may be located at any physical point in the network, but a particular IP address is associated with the mobile node itself (rather than the physical point of connection). The home network may physically span a small office environment, or may span a number of countries.

The mobile node MN 8 may be connected to the home network 2 by a wireless LAN, infrared link, wireless telephone link or via a direct Ethernet or token ring network hook-up. The term 'mobile node' does not imply that the node is connected to the network via a wireless link: rather it implies that the mobile node may move outside the home network 2 into a foreign network such as the foreign network 6 of FIG. 1, as will be discussed in further detail hereinafter.

The arrangement of FIG. 1 also shows a correspondent network 4 including a correspondent node CN 10. For the purposes of illustrating the present invention, it is assumed that the correspondent node CN 10 of the correspondent network sends a message to the mobile node 8 of the home network 2. The correspondent node may also be in a foreign network, that is a network independent of and distinct from the home network 2. However, the term foreign network is reserved for use to refer to a network that hosts a mobile node that normally resides in a different network (i.e. other than its home network). For the purposes of this illustrative example, the mobile node 8 of the home network 2 has moved to the foreign network 6. Thus the mobile node MN 8 is shown in the home network 2 in dashed lines to indicate that it is normally present there, and is shown in the foreign network FN 6 in a solid line to indicate that it is temporarily present in the foreign network 6.

The terms correspondent node and correspondent network are reserved for use to describe communication peers of the mobile node 8. A correspondent node is a node (which may be another mobile node) with which a mobile node is currently communicating: either receiving an IP packet or transmitting an IP packet. A correspondent network is used to refer to the network to which the correspondent node is connected. It should be appreciated that the mobile node may be communicating with a correspondent node in its own home network, and therefore the correspondent network may be the home network itself.

As can be seen from FIG. 1, and as will be discussed further hereinafter, the home network 2 further includes a home agent 12.

A brief example of the 'normal' communication between the correspondent node CN 10 and the mobile node MN 8 will now be given. Referring to FIG. 2(*a*), there is shown the general structure of an IP packet 14 sent by the correspondent node CN 10 to the mobile node MN 8.

An IP packet transmitted between networks, generally designated by reference numeral 14 and illustrated in FIG. 2(*a*), comprises an IP header 30, and an IP payload 22. The IP payload 22 is the information portion of the IP packet to be delivered to the mobile node 8. The parts of the IP packet that are relevant to the present discussion are illustrated in FIGS. 2(*b*) and 2(*c*). The IP header 30, shown in FIG. 2(*b*), includes a source address portion 16, a destination address portion 18, and a protocol ID portion 20. The IP header 30 contains other fields that are not shown in FIG. 2(*b*) since they are not relevant to the present explanation.

Referring to FIG. 2(*c*), the IP payload 32 includes a source port number 34 and a destination port number 36. Again, the IP payload includes other fields that are not relevant for the purposes of the present explanation.

The source address 16 is the IP address of the host terminal (correspondent node) from which the IP packet is sent, and the destination address 18 is the IP home address of the host terminal (mobile node) to which the IP packet is to be sent. The source port number 34 is the port number used by an application at the correspondent node 10 associated with the IP packet 14. The destination port number is the port number used by an application at the mobile node 8 to which the IP packet is being sent. In addition to other uses, the protocol ID 20 is one of the indications of the quality of service to be supported in signaling the IP packet from the source applications to the destination applications. As will be appreciated by one familiar with the art, the destination and source addresses are used by routing switches between the correspondent node and the mobile node in the home network to route the IP packet to its destination.

When the routers or routing switches support quality of service (QoS), in some QoS control provisions, such as RSVP and IntServe, the protocol ID 20 is used together with the source and destination addresses 16 and 18, plus the communication port numbers of end applications (i.e. the source port number 34 and the destination port number 36) for differentiating flows and imposing the necessary QoS control.

The QoS control imposed on the data traffic flows at the intermediate routers is system dependent. For example, it can be the so-called WFQ (Weighted Fair Queuing) or CBQ (Classed Based Queuing). They are not standard and vendor specific but usually independent of the actual user's protocol ID.

The IETF's IntServe/RSVP standard is defined to provide a QoS specification and signaling mechanism but not a QoS control mechanism. IntServe/RSVP is independent of the actual QoS control mechanisms, such as WFQ, CBQ etc.

The status based on which QoS control is performed is set up in the routing switches prior to data transmission by means of the specific quality of service signaling protocol, such as RSVP.

A known way of routing an IP packet from the correspondent node to the mobile node MN 8 when it has moved to a position in the foreign network will now be described. When the mobile node MN 8 moves to a foreign network, it must register with the home agent HA 12 of the home network so as to still be able to receive its messages when residing in the foreign network. This may be achieved by the mobile node sending a registration message to the home agent HA 12 once it has taken up position in the foreign network. A mobile node can be considered to have taken up position in the foreign network once it has been connected to the foreign network and been allocated a care-of address.

Figure 3:
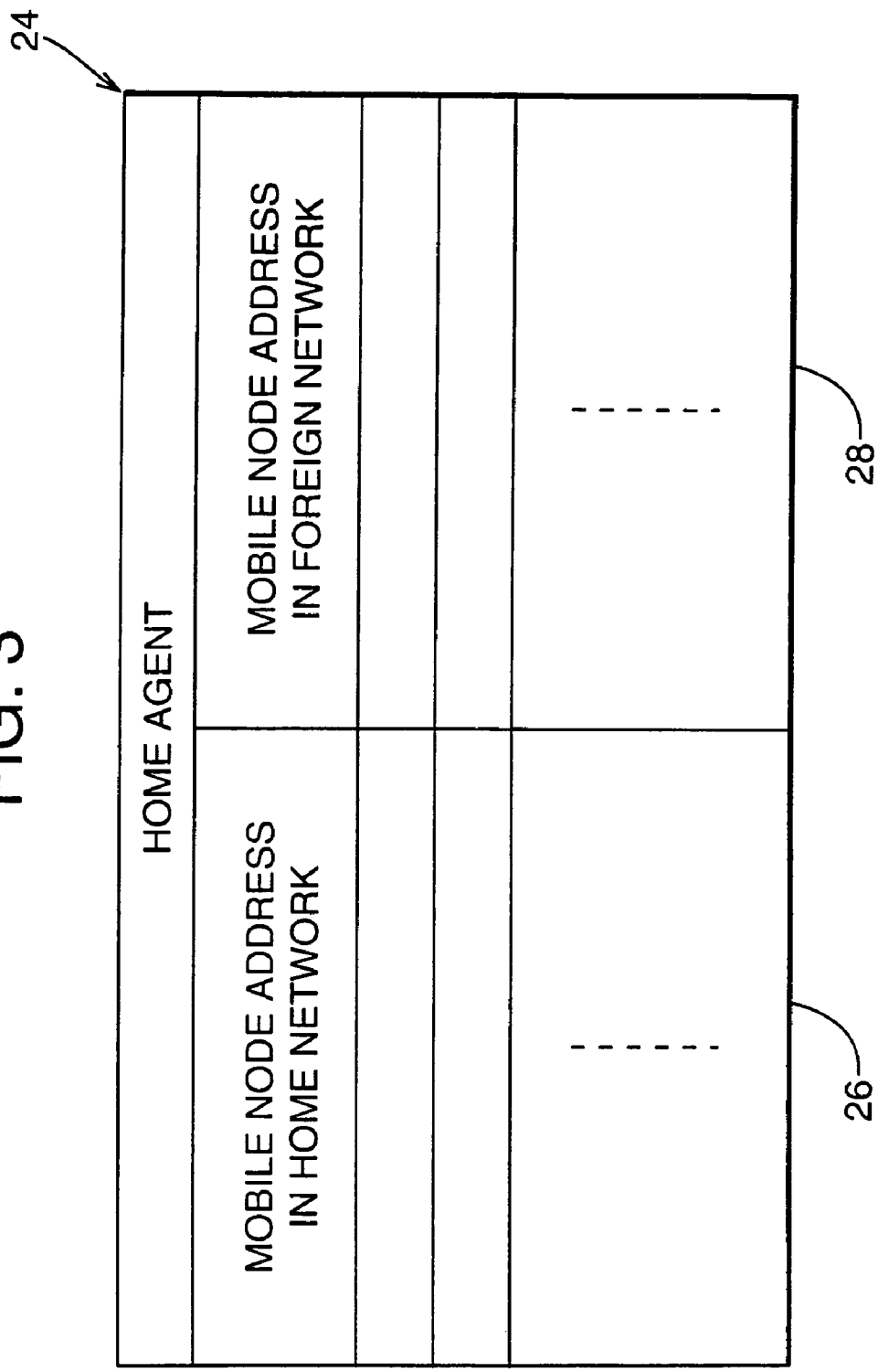
FIG. 3 illustrates schematically a memory of a home agent of the home network.

Referring to FIG. 3, the home agent HA 12 includes a memory or look-up table generally designated by reference numeral 24. In one column of the memory the home agent HA 12 stores the addresses of the mobile nodes normally resident in the home network that have registered with the home agent as being temporarily resident in a foreign network. In another column 28 of the memory 24 the home agent stores the 'care-of' address that the mobile node has moved to in the foreign network, as well as other associated states such as SPI (Security Parameter Index).

The technique by which the home agent records the current care-of address of the mobile node and its home address (i.e. the mobile node address in the home network), is usually implementation dependent. This invention does not exclude different approaches for achieving the location-awareness of a mobile node at the home agent.

The operation of the home agent in directing an IP packet from the correspondent node to the mobile node in the foreign network according to one current known technique will now be described.

The correspondent node CN 10 constructs an IP packet having a format identical to that shown in FIG. 2(*a*). The thus constructed IP packet from the correspondent node is illustrated by the IP packet 50 in FIG. 4(*a*), and includes a source address 60 identifying the correspondent node address, a destination address 62 identifying the home address of the mobile node in the home network, and a protocol ID 66, nominally referred to as protocol 'A'. The source port number and destination port number are not shown in FIGS. 4 and 5 since they are not relevant to the explanation.

In the example shown in FIG. 1, after moving to the foreign network 6 the mobile node 8 is allocated a unique 'care-of' address of its own and registers directly with the home agent 12 in the home network. This is known as CO-COA (co-located care-of address) working mode. An alternative working mode is known as FA-COA (foreign agent care-of address) working mode. The manner in which the mobile node may register with the home agent is well-known in mobile IP, and is not relevant to the present invention and therefore not discussed herein.

The IP packet constructed by the correspondent node 10 is identical whether the mobile node is positioned in its home network 2 or in the foreign network 6, as the correspondent node is not required to have knowledge of the movement of the mobile node. Mobile IP with route optimization does, however, require that the correspondent node is aware of the current location of the mobile node.

After a mobile node registers with the home agent using its current care-of address, the home agent will take a mobile node to be in a foreign network and starts intercepting the IP packets 50 destined to that mobile node home address and tunneling those IP packets to the mobile node's current care-of address.

The home agent monitors all IP packets coming into the home network to see if the destination address in the home network (the portion 62 of the IP header fields 52) matches one of the mobile node home addresses stored in column 26 of the home agent memory 24.

If a match is detected, the home agent creates a new IP packet, which is illustrated in FIG. 4(b). The original IP packet from the correspondent node, including the destination address, source address, protocol ID, and other IP header fields and payload is used to form part of the payload of the new IP packet. That is, the original IP packet is not processed at all by the home agent but is merely incorporated, wholly unchanged, as the payload 32 of the new IP packet 30.

The home agent then adds a destination address 36, source address 38 and protocol ID 40 to the new IP packet 30.

The destination address 36 is the address in the foreign network where the IP packet is to be sent, that is the 'care-of' address of the mobile node MN 8. The source address 38 is the address of the home agent from which the new IP packet 30 is being sent, i.e. the home agent.

The home agent protocol ID is the protocol ID determined by the home agent itself. The home agent will always attach the same protocol ID to the new IP packet 30 regardless of the protocol ID 20 included in the original IP packet by the correspondent node, since the home agent does not look at the protocol ID 20 of the original IP packet 14. The protocol ID 40 is designated nominally as protocol 'X'. For the conventional mobile IP's IP-in-IP's encapsulation, the protocol ID is always changed to "1" by the home agent.

Thus the 'real' source and destination addresses (60 and 62 of FIG. 4(a)) have been moved into the payload of the new IP packet and the other necessary flow identification information such as source and destination port numbers in the original IP payload have also been wrapped up in the payload of the new IP packet.

Thus, the original identity of a flow from the correspondent node to the mobile node is lost and quality of service fails as the IP packet is routed from the home agent to the foreign network.

The IP packet 30 is then sent by the home agent, and is routed to arrive at the mobile node's 'care-of' address in the foreign network. Once the IP packet 30 arrives at the 'care-of' address the mobile node strips the outer layers of the new IP packet 30 to reveal the original IP packet 50.

Thus, it can be appreciated that in this known arrangement, the required flow identification information including the protocol ID in the original IP packet is shielded by the home agent and thus becomes unrecognizable by the routing switches (or IP routers) for QoS provision between the home agent and the mobile node's 'care-of' address.

The routing of an IP packet from the correspondent node to the mobile node's 'care-of' address according to an alternative preferred implementation is now described. In the scheme according to this alternative preferred implementation, the flow identification and differentiation information such as the original source address, the original source and destination port number, and the source protocol ID placed in the original IP packet by the correspondent node remains unchanged and thus is advantageously available to all the routing switches between the correspondent node and the mobile node's 'care-of' address.

Figure 5A:
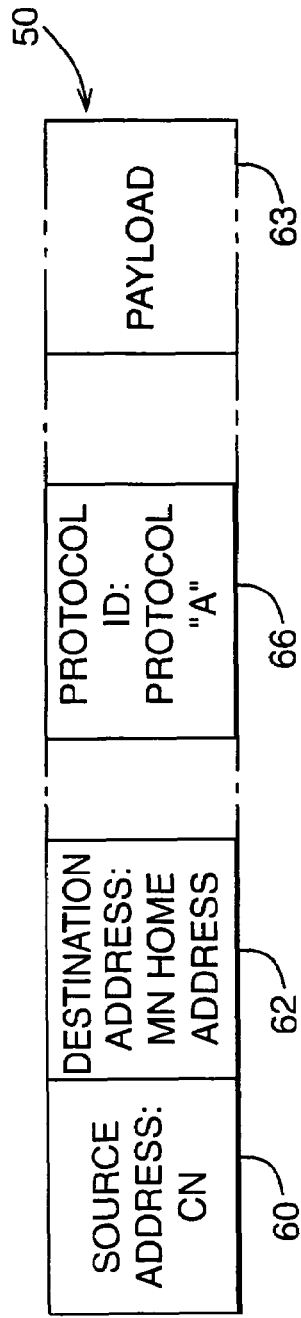
FIG. 5(a) illustrates an IP packet constructed by the correspondent network for transmission to a mobile node in the home network.
Figure 5B:
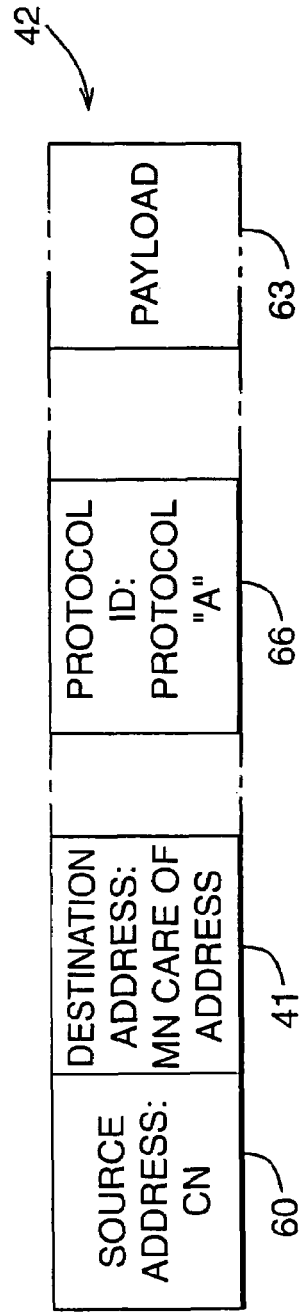
FIG. 5(b) illustrates the modification of that IP packet to re-direct it to the foreign network according to an alternative technique.

The correspondent node constructs the IP packet 50 identically as before as shown in FIG. 5(a). On arrival at the home network, the home agent 12 determines whether the mobile node to which the IP packet is addressed is registered as having moved to a foreign network, by checking the contents of its memory 24 as before. On detection of the destination address in its memory column 26, the home agent intercepts the IP packet.

In this implementation, the home agent HA 12 adapts the IP packet 50 by removing the destination address 62 of the mobile node 8 in the home network 2, and replacing it with the destination address (i.e. the 'care-of' address) of the mobile node MN 8 in the foreign network 6. The new IP packet 42 thus comprises the payload 63 of the original IP packet 50, the source address 60 of the original IP packet 50, and the protocol ID 66 of the original IP packet 50. The destination address 62 of the original IP packet is replaced by the new destination address 41 (the mobile node's care-of address).

Of course one familiar with the art will understand that it may be necessary to amend any error checking provided in the original IP packet 50 in view of the change in the destination address. The thus constructed new IP packet is sent to the 'care-of' address in the foreign network. The IP packet is thus routed to the mobile node with the flow information including the source address of the correspondent node, and the original protocol ID as well as all other original flow identification information: it can be appreciated that as the payload remains unchanged, the source and destination port numbers are available in the same locations in the IP packet as before.

The flow identification information is thus recognized as the IP packet from the same correspondent node featuring the same QoS requirements to the routers between the home agent and the 'care-of' address as well as between the correspondent node and the home agent regardless of the movement of the mobile node. Advantageously, in this arrangement (co-located care-of address working mode), the new IP packet 42 constructed by the home agent according to the present invention is the same length as the original IP packet provided by the correspondent node.

In this preferred implementation of tunneling, the flow information is not hidden, and therefore the quality of service is apparently supported. However, for RSVP quality of service this is not the case. The reason for this is that for RSVP to correctly function, the transmit path followed by a so-called Reservation (Resv) message (routed hop-by-hop following the same hops as indicated by a so-called Path message) must be the same path but in the reverse direction of the Path message. That is the source address of the Path message must match the destination address of the Reservation (Resv) message, and the destination address of the Path message must match the source address of the Reservation message. The below example of setting up an RSVP session in the network structure of FIG. 1 illustrates why the non-encapsulation mobile IP, as described hereinabove, is not sufficient to support quality of service.

To support an RSVP session when the mobile node has moved into a foreign network as shown in FIG. 1, a two-section RSVP session must be set up: a first section of the RSVP session ("section 1") between the correspondent node 10 and the home agent 12, and a second section of the RSVP session ("section 2") between the home agent and the mobile node 8.

Figure 6A:
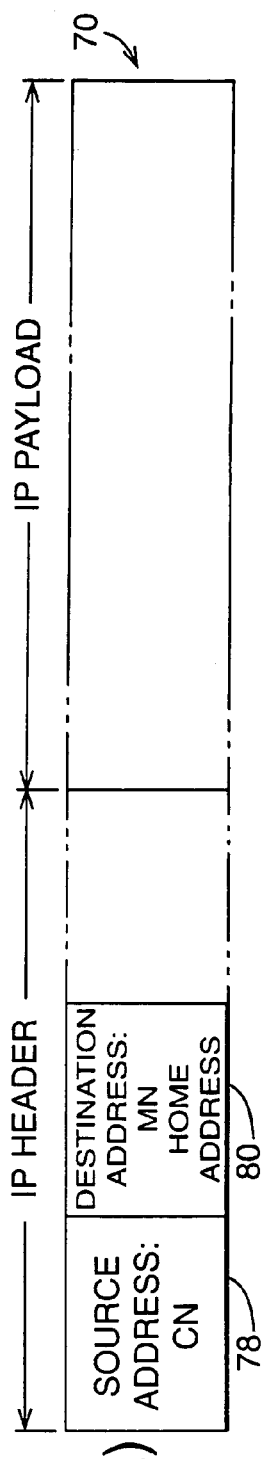
FIG. 6(a) illustrates the IP packets of a Path message of a first section of a quality of service session in standard mobile IP.

The correspondent node 10, which in this example is assumed to be sending a message to the mobile node 8, sends a standard RSVP Path message including IP packets 70 having the general format shown in FIG. 6(a) on line 128.

Figure 2A:
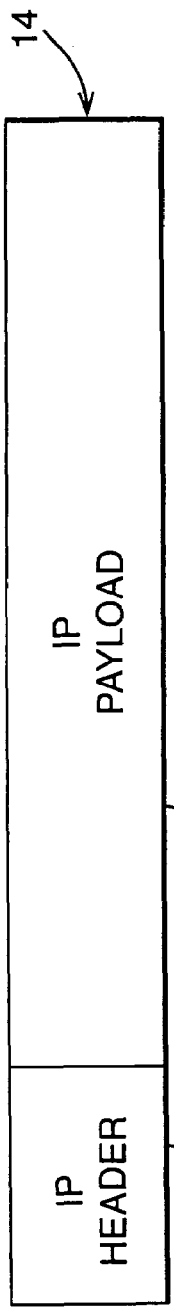
FIGS. 2(a), 2(b), and 2(c) illustrate the standard format of an IP packet.
Figure 2B:
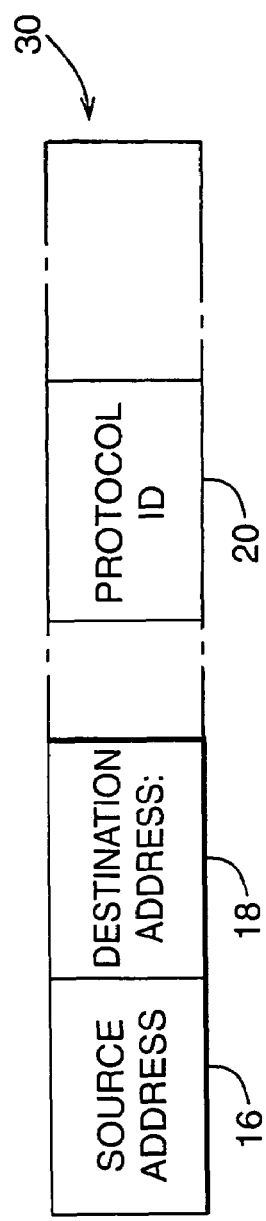
Figure 2C:
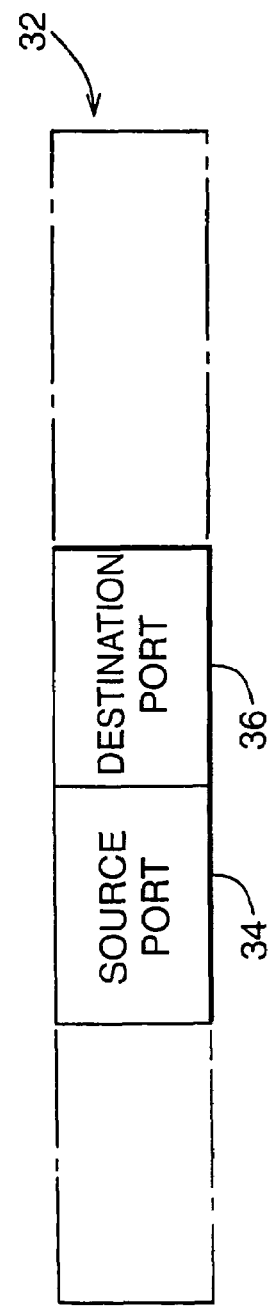

The IP packets of the messages used in an RSVP session do not have the format shown in FIGS. 2(a) to 2(c). The IP packets of FIGS. 2(a) to 2(c) are IP packets of data messages. The IP packets 70 of the Path message of FIG. 6(a) have a source address 78 corresponding to the address of the correspondent node, and a destination address 80 corresponding to the address of the mobile node 8 in the home network (the mobile node's home address).

The IP packets of the Path message (and other RSVP messages) additionally include other flow identification information in the payload of the IP packets. One skilled in the art will be familiar with the other flow identification information.

The IP packet of the Path message is routed from the correspondent node 10 to the home network 2 via a plurality of routing switches, represented by routing switch 132a, on lines 128 and 124.

If the routing switch 132a supports quality of service, then it extracts the flow identification information in the IP payload of the Path message IP packets, and stores this flow identification information. This flow identification information includes: the source address, the destination address, the source port number, the destination port number, and the protocol ID which will be included in all IP data packets transmitted from the source to the destination after the quality of service session has been set-up. The routing switch 132a routes the IP packets of the Path message to another routing switch, and then additionally stores with the flow identification information extracted from the IP packet the address of the routing switch to which it sent the message (the next hop) and the address of the routing switch from which it received the message (the previous hop).

Although in FIG. 1 it is illustrated that the IP packets reach the home network 2 via one routing switch 132a, in practice the IP packets may reach the home network via a plurality of routing switches, and each routing switch stores the flow identification information extracted from the IP packets of the Path message, together with the identity of the routing switch from which the IP packet was sent and the routing switch to which the IP packet was sent.

Thus the IP packets of the Path message travel from the correspondent node to the home network through the routing network. Each routing switch retains the address of the previous hop from which the IP packet was sent together with the next hop to which the IP packet was sent, and additionally the flow identification information for the IP packet. The routing switches also process the other traffic related information in the Path message, the nature of which is not relevant to a discussion of the present invention.

After the quality of service session has been set-up, when another IP packet arrives at a particular routing switch having the same flow identification information that has been stored in the routing switch memory, the routing switch forwards it to the exact same next hop, the address of which is stored in memory.

Thus at successive hops, each routing switch (provided it supports RSVP quality of service) retrieves the flow identification information from the fixed locations of the IP packets of the Path message and stores them in memory, together with the addresses of the next and previous hops. Thus the flow identification information in the IP packets helps to uniquely identify a message flow, so that all IP packets associated with that message flow can be routed from the source to the destination through the exact same network path.

Figure 6B:
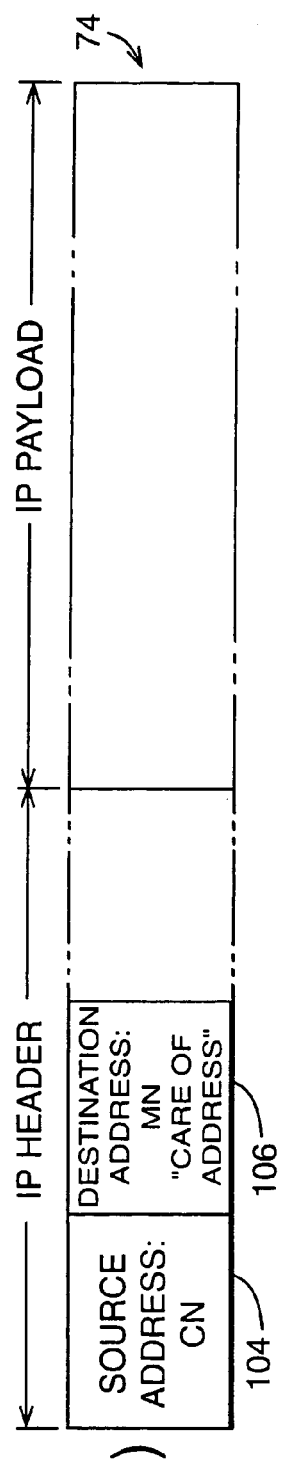
FIG. 6(b) illustrates the IP packets of a Path message of a second section of a quality of service session in standard mobile IP.

The home agent then intercepts the IP packets of the Path message intended for the mobile node. When the home agent intercepts the IP packets of the Path message destined for the mobile node 8, it redirects them to the foreign network. In this example non-encapsulation mobile IP is utilized, and new IP packets are created for transmission to the foreign network as a new, or modified, Path message. The IP packets 74 of the modified Path message sent by the home agent are shown in FIG. 6(b). The home agent replaces the destination address of the IP packets of the Path message, such that the destination address 106 of the IP packets 74 of the modified Path message is the mobile node's care-of address in the foreign network. As discussed hereinabove, in non-encapsulation mobile IP all other elements of the IP packets 70 remain unchanged.

This modified Path message is routed to the mobile node's care-of address via routing switches represented by the single routing switch 132b, on lines 126 and 130.

As described hereinabove in relation to the first section of the Path message, in the second section of the Path message the IP packets of the modified Path message are similarly transmitted based on the flow identification information therein. The next and previous hops are similarly stored by the routing switches.

Figure 6C:
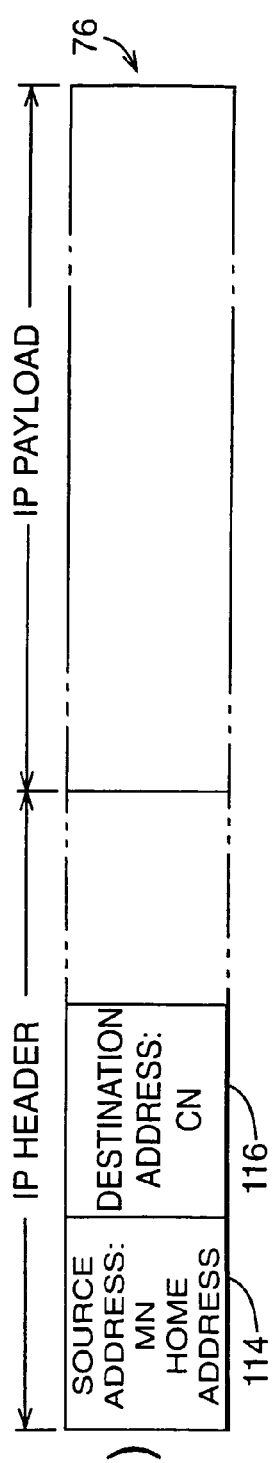
FIG. 6(c) illustrates the general end-to-end structure of a Reservation message in general IP.
Figure 6D:
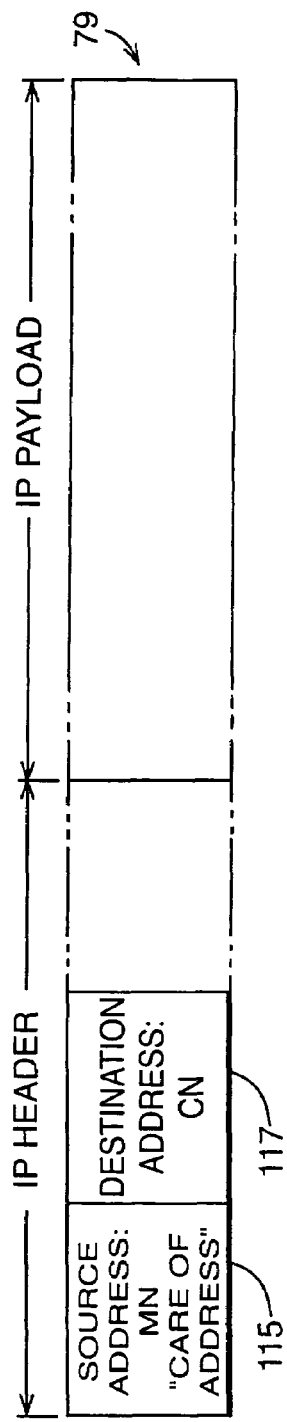
FIG. 6(d) illustrates the general end-to-end structure of a Reservation message of a second section of a quality of service session in mobile IP supporting RSVP.
Figure 6E:
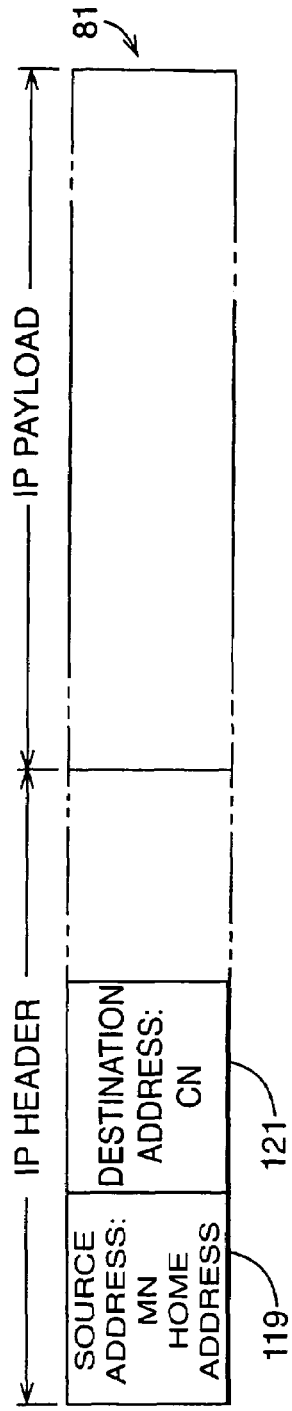
FIG. 6(e) illustrates the general end-to-end structure of a Reservation message of a first section of a quality of service session in mobile IP supporting RSVP.

The mobile node receives the modified Path message and initiates the Reservation (Resv) message for the second section by creating a Reservation message for transmission having IP packets 76 of the general format as illustrated in FIG. 6(c).

It will be understood by one skilled in the art that the IP packets of a Reservation message (Resv) are transmitted hop-by-hop back along the identical network path as the IP packets of the Path message. Thus the source and destination addresses of the IP packets of the Reservation messages are actually the last and previous hops. The value of the source and destination addresses are thus determined dynamically as the Reservation messages transit through the path. Thus the structure of the IP packets 76 of the Reservation message shown in FIG. 6(c) is actually representative of the transport layer of the Reservation messages. Thus the structure shown in FIG. 6(c) illustrates the general concept of a Reservation message, that is the originating source address and the ultimate destination address. This analysis of the Reservation message is somewhat artificial, but serves to best illustrate the principle of RSVP.

The mobile node 8 identifies the source address 114 as the mobile node's home address. Standard mobile IP provides that the applications on a mobile node itself should not be required to be aware of the change of the mobile node's network attachment points. Therefore regardless of the location of the mobile node (whether in its home network or a foreign network) the mobile node always generates IP packets which identify the source address as being the mobile node's homes address. The mobile node includes a destination address in the Reservation message of the correspondent node address. This is because, in accordance with standard mobile IP, the mobile node is aware that the message came from the correspondent node, and is not aware of the redirection via the home agent. For IP packets sent from the mobile node to the correspondent node in standard mobile IP, they are routed as normal IP packets as if the mobile node were 'at home' in the home network.

Comparing the IP packets of the Path and Reservation messages shown FIGS. 6(*b*) and 6(*c*), the conditions for a successful RSVP session do not exist. The source address of the reservation message 76 is different to that of the destination address of the path message 74.

This results in the failure of the routing of the Reservation (Resv) message hop-by-hop following the same network path as that set by the IP packets of the Path message. The Reservation message for the first section (between the home agent and the correspondent node) is never initiated because the second section fails.

Figure 7:
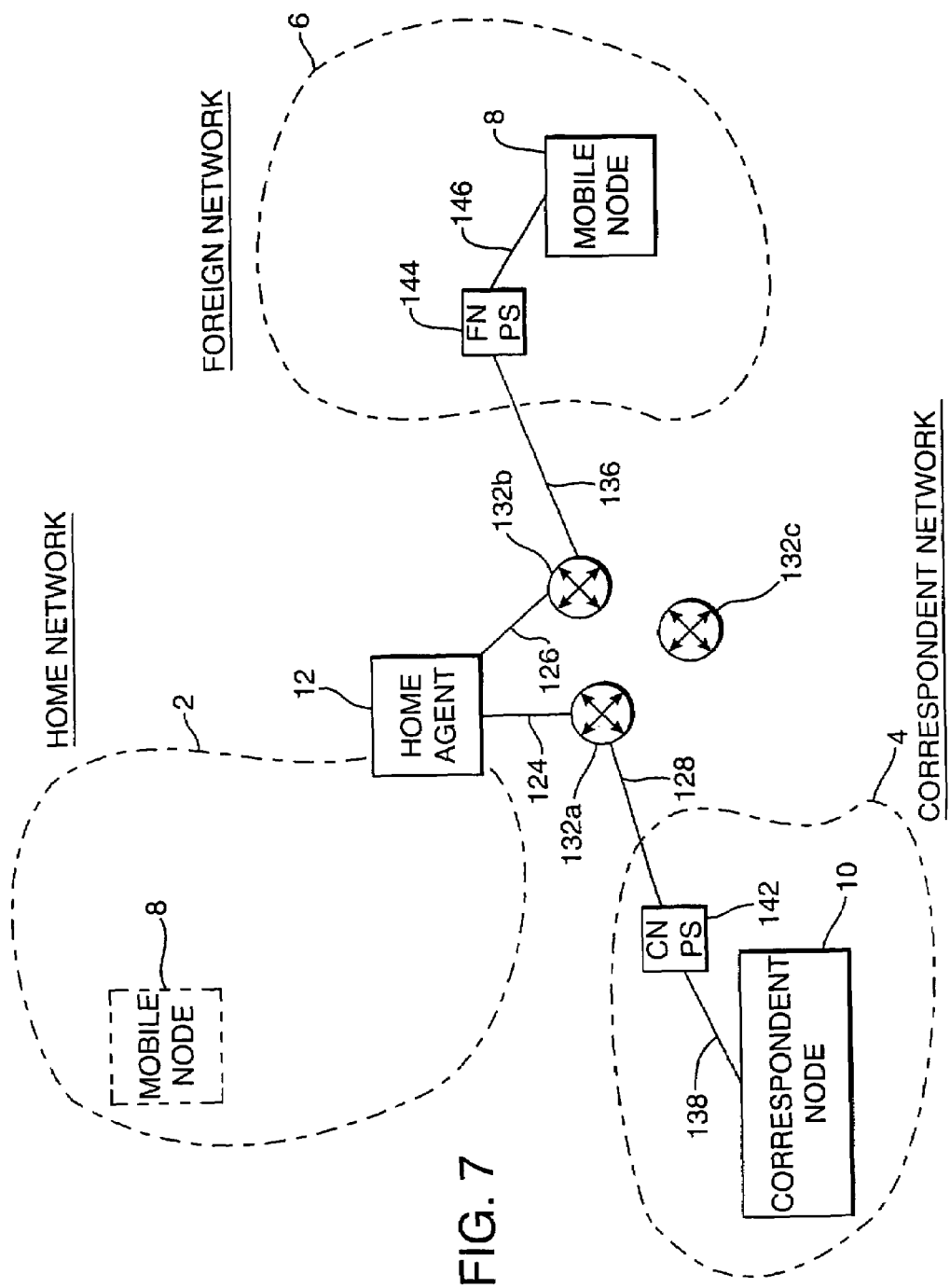
FIG. 7 illustrates one network arrangement of FIG. 1 adapted to support RSVP in mobile IP according to the present invention.

Referring to FIG. 7, there is shown the network arrangement of FIG. 1 adapted to enable non-encapsulation mobile IP to support RSVP. In the arrangement shown a proxy server is introduced into the correspondent network and the foreign network. However, it should be understood from the following description that the functionality of the proxy server may in practice be incorporated into the host terminals to which the proxy servers are connected. A further explanation is given hereinbelow following the explanation of the arrangement of FIG. 7.

Referring to FIG. 7, the networks of FIG. 1 are adapted such that the correspondent network 4 additionally includes a correspondent network proxy server 142 and the foreign network 6 additionally includes a foreign network proxy server 144. The correspondent node 10 is connected to the correspondent node proxy server 142 via a network link 138. The correspondent network proxy server connects to the routing switches via a network link 128. The foreign network proxy server 144 connects to the mobile node 8 in the foreign network 6 via a network link 146. The foreign network proxy server connects to the routing switch 132*b* via the network link 136.

An example of the operation of the adapted network of FIG. 8 for sending a message from the correspondent node 10 to the mobile node 8 in the foreign network using non-encapsulation mobile IP in which RSVP is supported will now be described.

Each host terminal which requires quality of service provision in a network needs to be aware of the existence of a proxy server in the network. That is, there must be a process by which the host terminals can discover proxy servers. There are effectively two ways this can happen. In a first way, host terminals in the network broadcast a server soliciting message (SSM). A proxy server in the network responds by sending back to the host terminal a server response message (SRM). In a second way, the proxy server in a network broadcasts a client request message (CRQM) to the local network. Responsive thereto, host terminals (which can be considered to be proxy server clients) send back a client registration message (CRGM). In this way the presence of the proxy servers in the networks is registered by host terminals in the networks in much the same way as the presence of agents (home agents, foreign agents) is currently registered in standard mobile IP. The implementation of the technique for nodes to register with proxy servers will be within the scope of one skilled in the art.

As discussed hereinabove, to successfully establish a quality of service session between the correspondent node and the mobile node when the correspondent node is sending a message to the mobile node, it is necessary to establish an RSVP session with two sections. Generally speaking, a first section of the quality of service session must be established between the correspondent network and the mobile node's home network, and a second section of the quality of service session must be established between the home network and the foreign network.

The technique for establishing the first quality of service session, and particularly an RSVP session in mobile IP, for the network arrangement of FIG. 7, will now be described with the aid of the flow diagram of FIG. 8.

According to the present invention, in a step 150 the correspondent node 14*a* initiating a quality of service session sends a quality of service request on network link 138 to the correspondent network proxy server 142.

The quality of service request may be implicit or explicit. An explicit quality of service request from the correspondent node specifies an exact quality of service requirement. Thus an explicit quality of service request can be provided only by a correspondent node which has the functionality to support the explicit statement of a particular quality of service. An implicit quality of service request from the correspondent specifies only the nature of the transmission to be made. For example, an implicit quality of service request may indicate that the data to be sent is video data. The proxy server then determines the appropriate quality of service in dependence on the indication of the type of data.

The correspondent network proxy server 142, in a step 152, then sends a standard RSVP Path message. This Path message is communicated to the home network proxy server via the routing switch 132*a* on lines 128 and 124.

The IP packets of the Path message sent by the correspondent node proxy server corresponds identically to IP packets 70 of FIG. 6(*a*), and are routed by the routing network comprising the routing switches 132 to the home agent 12. The routing takes place in exactly the same manner as described before.

In a step 154 the home agent intercepts the IP packets of the Path message, and adapts the IP packets as described above to generate the IP packets for the modified the Path message.

The IP packets of the modified Path message correspond identically to the IP packets 74 of FIG. 6(*b*). In a step 156 the IP packets comprising the second section of the Path message 74 are transmitted by the home agent and routed via the routing network represented by the routing switch 132*b* to the foreign network 144.

The foreign network proxy server receives the second section of the Path message, and in a step 158, the foreign network proxy server 144 sends a quality of service indication signal to the mobile node 8 on line 146, indicating the quality of service requested by the correspondent node 10. If the quality of service level is acceptable to the mobile terminal, the mobile terminal sends a quality of service response by way of acknowledgment to the foreign network proxy server 144 in a step 160 on network link 146.

In a step 162 the foreign network proxy server then sends a modified Reservation message (i.e. modified relative to the Reservation message sent with standard mobile IP), confirming the quality of service session. The modified Reservation message follows the identical route to the Path message (in reverse) via lines 136 and 126.

The format of the modified reservation message 77, for the second RSVP session, sent back by the foreign network proxy server is illustrated in FIG. 6(*d*). As can be seen, because of the use of the foreign network proxy server 144 the source address 115 is the mobile node care-of address, and the destination address is the correspondent node's address. Thus the correct correlation exists between the source and destination addresses of the Path and Reservation messages in the second RSVP session, such that the RSVP session is supported.

Again, the message shown in FIG. 6(*d*) is representative of the end-to-end message between the foreign network and the home network. The format shown in FIG. 6(*d*) is not representative of the IP packets of the Reservation message, which as discussed above have source and destination addresses corresponding to the previous and next hops.

In a step 164 the home agent receives the modified Reservation message. The home agent adapts the Reservation message to the form shown in FIG. 6(*e*), which forms a further modified Reservation message. In order to perform this adaptation, the home agent is provided with the functionality of a proxy server therein. Alternatively a home network proxy server, equivalent to the correspondent network and foreign network proxy servers, may be provided in the home network and be associated with the home agent.

The RSVP session is completed by the home agent sending the further modified Reservation message back to the correspondent network via the routing switch 132*a* and the network links 124 and 128. As shown in FIG. 6(*e*) the Reservation message has as the source address 88 the home address of the mobile node, and as the destination address the address of the correspondent node. Thus the section of the RSVP session between the correspondent network and the home network is equivalent to a standard static RSVP session. The flow information required by the routing switches in the routing networks to support RSVP is fully available. The source and destination addresses are 'swapped' in the further modified Reservation message relative to the Path message.

In a step 166 the home agent then sends the Reservation message for the first section. The further modified Reservation message is then sent to the correspondent network 4 where it is received by the correspondent network proxy server 142.

The correspondent network proxy server then sends, in a step 168, a quality of service confirmation message on the network link 138 by way of acknowledgment to the correspondent node 10, indicating that the quality of service session has been set up.

The correspondent node 10 then begins sending data message packets to the mobile terminal. However the data message packets do not go via the correspondent network proxy server or the foreign network proxy server. The proxy servers are used only during the set-up of the RSVP session.

Once the RSVP session is set-up as described, and messages are sent from the correspondent node to the mobile node, it is essential that the flow identification information carried by the IP packets of the data message match that used in the set-up of the RSVP session. Thus the IP data packets, having the general format shown in FIG. 2, must include the same source port number, destination port number, and protocol ID contained in the payload of the RSVP message, as well as the source and destination addresses. In this way the data IP packets are uniquely identified as being associated with the flow configured by the RSVP session.

Thus the provision of the foreign network proxy server ensures that the RSVP quality of service is supported in mobile IP. The proxy servers shown in FIG. 7 can thus be considered to be "RSVP proxy servers". The proxy servers dynamically adapt the destination of the RSVP messages to follow the movement of the mobile node and in the meantime, guarantee that the flow identification information and quality of service information match the data flows directed according to non-encapsulation mobile IP (NEMIP).

It will be appreciated from the foregoing description that it is essential that the proxy server (or the equivalent functionality of the proxy server) is provided in the foreign network, that is a network which accommodates host terminals normally resident in other networks, if quality of service is to be supported in mobile IP.

The provision of the RSVP proxy server (or its functional equivalent) in the foreign network guarantees that the established RSVP session (in particular, the second section of the RSVP session) follows the movement of the mobile node whilst at the same time recording the correct flow information matching that of the data flows which follow that same path of the RSVP session, regardless of the change of the mobile node's point of network attachment.

No host terminal, when transmitting, will know whether the host terminal it is transmitting to is a mobile node, or whether it is in a foreign network having an RSVP proxy server. To ensure support of RSVP with mobile IP, each network which is capable of acting as a foreign network to host mobile nodes should be provided with a proxy server (or its equivalent functionality) with the functions as described herein. The above description of the functional control as performed by the proxy server in a foreign network is essential to supporting quality of service in a mobile environment.

Referring to FIG. 7, the essential requirement to support a quality of service session for a correspondent node in the correspondent network desiring to send data messages to the mobile node, is that the foreign network in which the mobile node is located must have a proxy server or its functional equivalent. The correspondent node can then directly set up the RSVP session itself without the need of the correspondent node proxy server.

The provision of the correspondent node proxy server, however, has the advantage that it enables terminals in the correspondent node not having RSVP functionality to initiate RSVP sessions. The proxy server provides a technique for configuring a quality of service session that is both platform and application independent. By providing a dedicated device for establishing quality of service sessions, then current and future quality of service incapable host terminals can have a quality of service session set-up and thus their quality of service control enabled across the transmit Path to their communication peers. The requirements for complicated and intensive computing as induced in many quality of service control signaling and control mechanisms, and strain on battery power for wireless/mobile terminals, is avoided.

In an alternative application, as mentioned consistently hereinabove, the functionality of the proxy server performed in the foreign network is performed in the mobile node itself. In such an application the mobile node will already be RSVP capable, and will have an RSVP daemon to support standard RSVP sessions. In such an application responsive to receipt of the modified Path message from the home network the mobile node will generate the standard RSVP message format shown in FIG. 6(*c*). The proxy server functionality embedded in the RSVP daemon of the mobile node will then modify this Reservation message to generate the modified Reservation message of FIG. 6(*d*). The modified Reservation message is then transmitted directly from the mobile node.

It should be noted that the examples described herein throughout this text utilize standard RSVP. No change to the standard RSVP/IntServe is envisaged or proposed.

The invention has been described herein with reference to a particular example of an RSVP quality of service session that utilizes Path and Reservation messages. However, the invention is more generally applicable to any quality of service session which utilizes request and reply messages between two terminals for configuring a quality of service session, and where there is a requirement to overcome the problem identified herein.

What is claimed is:

1. A method of establishing a session between a correspondent node and a mobile node, the mobile node having a home address in a home network and being temporarily connected at a care-of address in a foreign network, the session being a quality of service session between the correspondent node and the mobile node, the method comprising the steps of:

generating, in the foreign network, a modified reply message of an Internet Protocol packet having a source address of the mobile node's care-of address in place of the mobile node's home address and having a destination address of the correspondent node;

transmitting the modified reply message to the correspondent node; and receiving a modified request message in the foreign network, the modified reply message being generated in response to the receipt of the modified request message in the foreign network, the modified request message being created by replacing a destination address of a request message received in the home network with the mobile node's care-of address, the request message received in the home network having a source address of the correspondent node and a destination address of the mobile node's home address; and wherein the quality of service session is an RSVP session, the request message is a Path message, and the modified reply message is a Reservation message.

2. The method of claim 1, wherein the step of generating the modified reply message is carried out by a proxy device in the foreign network, the proxy device being associated with the mobile node; and further comprising the steps of:

responsive to receipt of the modified request message at the proxy device, sending a quality of service indication signal to the mobile node, whereby the modified reply message is generated responsive to receipt of a quality of service acknowledgement from the mobile node.

3. The method of claim 1, further comprising the steps of:

receiving, in the home network, the modified reply message;

creating a further modified reply message by replacing the source address with the mobile node's home address; and transmitting the further modified reply message.

4. The method of claim 3, wherein the correspondent node generates the request message and receives the further modified reply message.

5. The method of claim 3, wherein:

the correspondent node is associated with a correspondent proxy device, whereby:

the correspondent proxy device generates the request message responsive to a quality of service request from the correspondent node; and the correspondent proxy device generates a quality of service confirmation responsive to receipt of the further modified reply message.

6. The method of claim 1, wherein the step of generating the modified reply message is carried out in the mobile node.

7. The method of claim 1, in which the step of generating the modified reply message is carried out by a proxy device in the foreign network, the proxy device being associated with the mobile node.

8. The method of claim 1 wherein the step of generating the modified reply message comprises:

generating a reply message having a source address of the mobile node's home address and a destination address of the correspondent node; and replacing the source address with the mobile node's care-of address, thereby generating the modified reply message.

9. A system configured to support a session, comprising:

a proxy device, in a foreign network, the proxy device being associated with a mobile node both having a home address in a home network and being temporarily connected at a care-of address in the foreign network, the proxy device being configured for generating a modified reply message of an Internet Protocol packet having a source address of the mobile node's care-of address in place of the mobile node's home address and having a destination address of a correspondent node, the session being a quality of service session between the correspondent node and the mobile node; and wherein the quality of service session is an RSVP session and the modified reply message is a Reservation message; and wherein the proxy device is configured to generate the modified reply message responsive to receipt of a modified request message in the foreign network, the modified request message being created by a home agent in response to receiving a request message having a source address of the correspondent node and a destination address of the mobile node's home address, the modified request message being created by the home agent by replacing the destination address of the request message received by the home agent with the mobile node's care-of address, the request message received by the home agent being a Path message.

10. The system of claim 9, wherein the proxy device is located in the mobile node.

11. The system of claim 10, further comprising the mobile node.

12. The system of claim 9, wherein the proxy device is located outside the mobile node and coupled to the mobile node.

13. The system of claim 12, further comprising the foreign network.

14. The system of claim 9, wherein the system is a mobile IP environment.

* * * * *